(12) United States Patent
Najork

(10) Patent No.: US 6,910,077 B2
(45) Date of Patent: Jun. 21, 2005

(54) SYSTEM AND METHOD FOR IDENTIFYING CLOAKED WEB SERVERS

(75) Inventor: Marc A. Najork, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 709 days.

(21) Appl. No.: 10/039,603

(22) Filed: Jan. 4, 2002

(65) Prior Publication Data

US 2003/0131048 A1 Jul. 10, 2003

(51) Int. Cl.7 .............................................. G06F 15/16
(52) U.S. Cl. ....................... 709/229; 709/203; 709/217; 709/218; 709/219
(58) Field of Search ............................. 707/4; 709/203, 709/218, 221, 229, 234, 245, 247, 330; 717/170

(56) References Cited

U.S. PATENT DOCUMENTS

| | | | | |
|---|---|---|---|---|
| 6,006,034 A | * | 12/1999 | Heath et al. ................ | 717/170 |
| 6,012,087 A | * | 1/2000 | Freivald et al. ............ | 709/218 |
| 6,163,811 A | * | 12/2000 | Porter ........................ | 709/247 |
| 6,185,563 B1 | * | 2/2001 | Hino .......................... | 709/229 |
| 6,202,207 B1 | * | 3/2001 | Donohue .................... | 709/221 |
| 6,269,362 B1 | * | 7/2001 | Broder et al. ................ | 707/4 |
| 6,615,237 B1 | * | 9/2003 | Kyne et al. ................. | 709/203 |
| 6,625,624 B1 | * | 9/2003 | Chen et al. ................. | 709/245 |
| 6,643,641 B1 | * | 11/2003 | Snyder ....................... | 709/218 |
| 6,823,362 B2 | * | 11/2004 | Eshghi ........................ | 709/203 |
| 2002/0065933 A1 | * | 5/2002 | Kobayashi .................. | 709/234 |
| 2002/0188665 A1 | * | 12/2002 | Lash .......................... | 709/203 |
| 2003/0088716 A1 | * | 5/2003 | Sanders ...................... | 709/330 |

* cited by examiner

*Primary Examiner*—David Wiley
*Assistant Examiner*—Quang N. Nguyen

(57) ABSTRACT

A search engine receives from a client a representation of a first object that was returned by a web server to the client in response to a request from the client. The search engine receives from the web server a second object in response to an identical request from the search engine, and compares the representation of the first object to a representation of the second object. The web server is determined to be cloaked if the representation of the first object does not match the representation of the second object. Typically, the client receives a URL embedded in a response to a search request submitted to the search engine. A toolbar operating in conjunction with the web browser on the client processes the URL. The processing includes: directing the web browser to obtain an object corresponding to the URL from a web server addressed by the URL; converting the object to a feature vector; and delivering the feature vector and the URL back to the search engine.

28 Claims, 4 Drawing Sheets

SYSTEM AND METHOD FOR IDENTIFYING CLOAKED WEB SERVERS

The present invention relates generally to a system and method for detecting cloaked web servers, and more particularly to identifying web servers that provide a first object to a client and a second object to a search engine (i.e., web crawler) in response to an identical request from each.

BACKGROUND OF THE INVENTION

Cloaking is the process by which a web server delivers a first version of an object, such as a web page or HTML document, to a user and a second version of the object to a search engine (or more specifically, a web crawler affiliated with the search engine) in response to essentially identical requests. A web crawler is a process that accesses a plurality of web servers to index the contents of the web servers. More specifically, the web crawler downloads objects from the web servers and stores the objects and their corresponding URLs (i.e., the network addresses of the objects) in a database. A search engine affiliated with the web crawler subsequently accesses the database to select zero or more objects that correspond to a search request received from a client (i.e., a user operating a personal computer).

Web servers are able to identify the program (i.e., a web crawler/search engine or a user's web browser) that emitted a request (e.g., an HTTP request) for a particular object by reference to content of the request. Table 1 illustrates the contents of a typical HTTP request:

TABLE 1

GET /index.html HTTP/1.0
HOST: www.domain_name.com
USER_AGENT: Mozilla/4.71
REFERER: http://search_engine.com The first line of Table 1 identifies the object sought and the location of the object on a corresponding web server. In this example, the object is an HTML document entitled "index.html" and is located in the root directory. Additionally, the first line includes a protocol identifier. In this example, the protocol is version 1.0 of HTTP, which is used to request and transmit files, especially web pages and web page components, over the Internet or other computer network.

The second line of Table 1 identifies the hostname, which can be translated into an Internet address, of a web server. In this example, the hostname is "www.domain_name.com". The URL corresponding to the object of this request is, therefore, "http://www.domain_name.com/index.html".

The third line of Table 1 is the USER_AGENT field, which identifies the program that emitted the request. In this example, "Mozilla/4.71" and the remaining text identifies the program as a Netscape® web browser. Note that web browsers are typically associated with users, not search engines.

The fourth line of Table 1 identifies the hostname of the entity that referred the requester to the identified web server. In this example, the referrer is a fictional search engine.

With respect to the present invention, line three of Table 1 is the most important. This line can indicate whether the request was sent by a web browser or a web crawler/search engine. More specifically, most web browsers set the USER_AGENT field to a string that is easily recognizable by a web server as corresponding to a web browser, and thus not a search engine/web crawler. Additionally, most web crawlers/search engines have well known names, which are typically included in the USER_AGENT field. For example, a web crawler associated with the search engine Alta Vista® is named "Scooter." A request for an object from this web crawler would, therefore, typically include the string "Scooter" in the USER_AGENT field. This field can, however, be arbitrarily set before being sent by a web browser or a web crawler/search engine to a web server. The USER_AGENT field does not provide, therefore, a foolproof means for identifying the program that emitted the request.

However, an IP-address typically included with a request can also be used to identify the program that emitted the request. Persons skilled in the art recognize that HTTP is a protocol that operates in conjunction with but on a higher level than TCP/IP, which is a packet based protocol, and that an IP-address is a 32-bit number that identifies each sender or receiver of TCP/IP packets. HTTP requests are included in TCP/IP packets, so HTTP requests are accompanied by the IP-address of the requestor.

Importantly, web server operators who engage in cloaking typically have lists of IP-addresses associated with web crawlers/search engines. So when, for example, an HTTP request is received by a web server, the IP-address is checked to determine whether the requester is, or is associated with, a web crawler/search engine. The IP-address of the requestor is thus another means for identifying the program that emitted the request.

Proponents of web cloaking claim a number of benefits from cloaking—including code (i.e., the design of a given object) and copyright protection. The importance of protecting code stems largely from financial gain made possible by a large number of referrals induced by the code.

Whether a search engine refers a given web server to a user (i.e., returns a URL corresponding to the given web server in response to a query from a user) depends upon the relevance of objects available from the web server to a given query. Relevance is, in turn, determined in part by, for example, an analysis of keyword combinations, keyword density, or keyword positioning found in a given object. If a search engine determines that an object is highly relevant to a particular keyword or set of keywords submitted with a query, the object may become desirable to other web server operators, which may copy or emulate the object. In particular, a duplicate of the object can be placed on another web server, which has the effect of devaluing the original object, or the object's keyword combinations, keyword density, and/or keyword positioning can be emulated to achieve the same level of relevance for another object. The comparative relevance of a given object can be determined by conducting searches designed to result in a referral of the object.

There is, however, a darker side to cloaking. Some web server operators seek to deceive search engines, and thus users, in order to increase the number of referrals to their web server. For example, an operator could supply an object that is highly relevant to common searches to search engines, but supply an unrelated page to a user in response to object queries. This action compromises search engine integrity and wastes user time.

There is needed in the art, therefore, a system and method for identifying cloaked web servers.

SUMMARY OF THE INVENTION

In summary, a method of the present invention includes a search engine receiving from a client a representation of a first object that was returned by a web server to the client in response to a request from the client. The search engine receives from the web server a second object in response to an identical request from the search engine, and then compares the representation of the first object to a representation of the second object. The web server is determined to be a cloaked web server if the representation of the first object does not match (i.e., exactly match or, preferably substantially match) the representation of the second object. The representations of the first object and the second object are preferably feature vectors. In some embodiments, the feature vector of the first object is said to match the feature vector of the second object if at least a predetermined number of features in the two feature vectors are the same.

In one embodiment, the client receives a URL embedded in a response to a search request submitted to the search engine. A toolbar operating in conjunction with the web browser on the client processes the URL. The processing includes directing the web browser to obtain an object corresponding to the URL from a web server addressed by the URL, converting the object to a feature vector, and delivering the feature vector and the URL back to the search engine.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
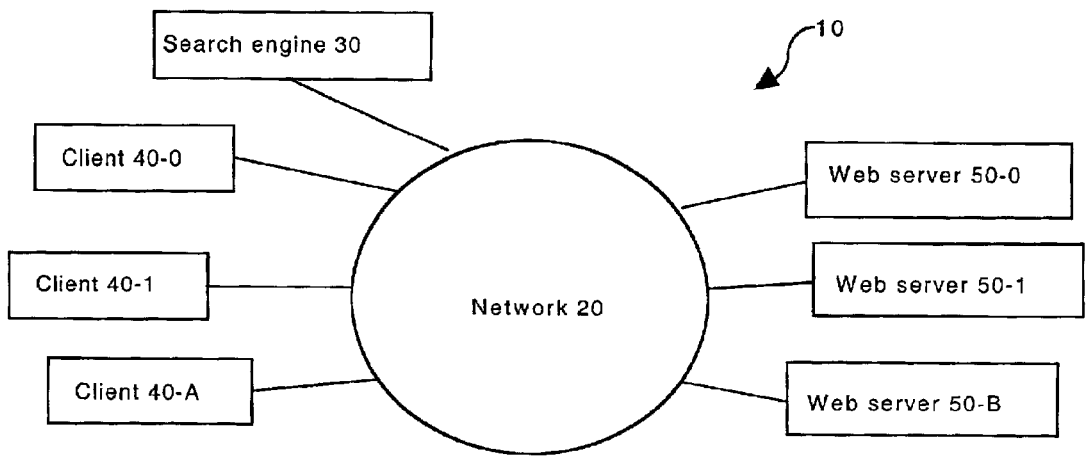
FIG. 1 illustrates a system including a network, clients, web servers, and a search engine in accordance with a preferred embodiment of the present invention.

Referring to FIG. 1, there is shown a diagram of a computer system 10 in which an embodiment of the present invention can be implemented. The computer system 10 includes at least one search engine 30, a plurality of clients 40 (also herein called client computers), a plurality of web servers 50, and a communications network 20. The communications network 20, which interconnects the search engine 30, the plurality of clients 40, and the plurality of web servers 50, is the Internet or other wide area network (WAN), an intranet, a local area network (LAN), metropolitan area network (MAN), or a combination of such networks.

Figure 2:
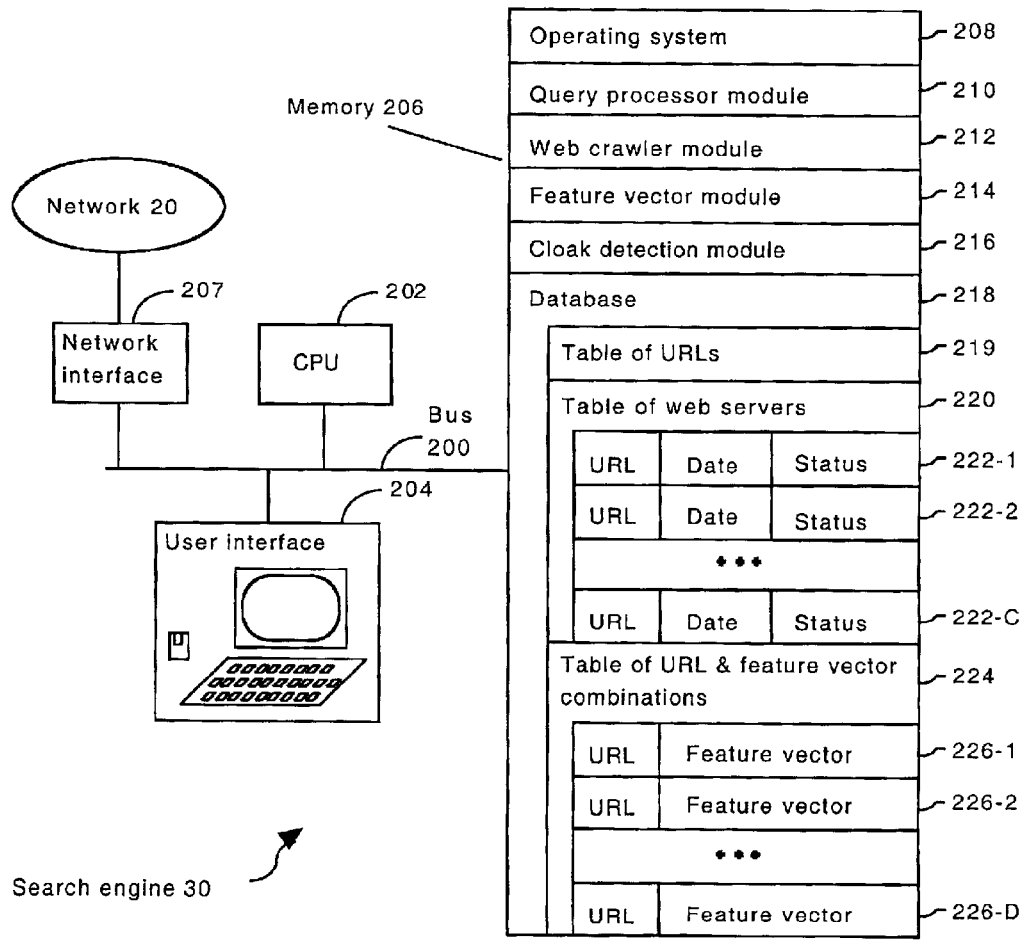
FIG. 2 is a block diagram of a search engine consistent with a preferred embodiment of the present invention.

As indicated in FIG. 2, the search engine 30 includes standard server components such as one or more processing units 202, an optional user interface 204 (e.g., keyboard, mouse, and a display), memory 206, a network interface 207 for coupling the search engine 30 to clients 40 and web servers 50 via communications network 20, and one or more system buses 200 that interconnect these components. Memory 206, which typically includes high speed random access memory as well as non-volatile storage such as disk storage, stores an operating system 208, a query processor module 210, a web crawler module 212, a feature vector module 214, a cloak detection module 216, and a database 218.

The operating system 208 includes procedures for handling various basic system services and for performing hardware dependent tasks. Further, the one or more processing units 202 execute the programs (i.e., the query processor module 210, the web crawler module 212, the feature vector module 214, and the cloak detection module 216) under the control of the operating system 208, which also provides the programs with access to system resources, such as the memory 206 and user interface 204.

The query processor module 210 responds to queries from clients 40 for the URLs of documents stored on the web servers 50. Each query typically includes one or more search terms, and the response to the query includes zero or more (and preferably one or more) network addresses (e.g., URLs) of objects (e.g., documents maintained by one or more of the web servers 50) corresponding to the one or more search terms. More particularly, the query processor module 210 typically selects zero or more URLs for inclusion in a response to the queries by reference to one or more search terms included in the query and to a table of URLs 219 maintained in a database 218. The particular methodology used for URL selection is not important to the present invention. Many techniques are known in the art, and all are within the scope of the invention.

The web crawler module 212 obtains objects from the web servers 50 that correspond to URLs included in the table of URLs 219. More specifically, the web crawler module 212 updates the list of URLs included in the table of URLs 219 periodically by downloading objects from web servers 50 and determining whether the objects have been modified since the last time a particular object was downloaded. If an object has been modified, information in the table of URLs 219 pertaining to the object is updated. The table of URLs 219 is preferably indexed by the words included in the objects corresponding to the URLs stored in the table of URLs 219.

The web crawler module 212 and query processor module 210 are well known in the art. Except as noted below, with reference to the cloak detection module 216, these two modules can operate according to any technique without departing from the scope of the present invention. Additionally, the web crawler module 212 and the query processor module 210 can also operate on separate servers.

The feature vector module 214 generates a feature vector for an object. A feature vector is a compressed representation of an object, comprising a plurality of discrete features, and is typically much smaller than the object. In preferred embodiments of the present invention, feature vectors are used to compare objects. The likelihood that a first object closely resembles a second object is very high when a feature vector derived from the first object and a feature vector derived from the second object include at least a predetermined number of features in common. For example, in an embodiment where the feature vector for each object contains eight features, two objects whose feature vectors have at least six features in common are assumed to be very similar. The generation of a feature vector is described in more detail below with reference to FIG. 6.

The cloak detection module 216 preferably augments the operation of the query processor module 210 and web crawler module 212 as indicated above. In particular, when the query processor module 210 receives a query from a client 40, the query processor module 210 notifies the cloak detection module 216, which responds by selecting, and forwarding to the query processor module 210, a URL corresponding to a web server 50. The selected URL returned to the query processor module 210 may be one of the URLs that is responsive to the client query, or it may be a URL that is unrelated to the URLs that are responsive to the client query.

In preferred embodiments, the cloak detection module 216 applies a predefined function to the table of web servers 220 to select a URL. As illustrated in FIG. 1, the table of web servers 220 preferably includes a plurality of records 222 including fields that store a URL, a date, and a state.

In some embodiments, the URLs include only an access protocol (e.g., http) followed by a hostname (e.g., www.domain_name.com). In these embodiments, therefore, the URLs stored in the table of web servers 220 do not specify a hierarchical description of an object or object location on a web server 50, which are typically configured to provide a default object when a hierarchical description of an object or object location are not included in an object request.

In other embodiments, however, a hierarchical description of an object or object location on a web server 50 is specified in each entry 222 (i.e., URL) of the table of web servers 220. In these embodiments, the table of web servers 220 can include a plurality of entries 222 that correspond to a single web server 50. In still other embodiments of the present invention, the table of web servers 220 may actually resemble, or be included in, the table of URLs 219.

The date field included with each entry 222 of the table of web servers 220 identifies the last date, if any, on which a web server 50 corresponding to the entry 222 was checked for cloaking. In preferred embodiments of the present invention, the date is a parameter of the function that selects a URL for inclusion with the response generated by the query processor module 210. Preferably, the odds of a given entry 222 being selected increase as the corresponding date becomes older.

The state field included with each entry 222 of the table of web servers 220 reflects the results of one or more determinations as to whether a corresponding web server 50 is cloaked. In some embodiments, the state is, effectively, either yes or no: "Yes", the corresponding web server 50 was cloaked as of the last test or "No", the corresponding web server 50 was not cloaked as of the last test.

Preferred embodiments of the present invention compare the feature vector of a page retrieved from a specified URL by a client computer 40 with the feature vector of the page retrieved from the same URL by the search engine 30, and use the results of this comparison to determine whether the web server 50 corresponding to the specified URL is cloaked. As noted above, a feature vector is a representation comprising a plurality of features. If, for example, all of the features included in two feature vectors match, the corresponding objects almost certainly match. And if none of the features included in two feature vectors match, the corresponding objects almost certainly do not match. But if just half of the features included in two feature vectors match, the corresponding objects are likely to be partially similar, but different in many respects. However, the amount of difference between the objects is somewhat indeterminate, although statistically the odds are very high that the two objects are significantly different. Such a situation may call for one or more states and corresponding policies. In some embodiments, therefore, an indefinite response (e.g., only half of the features match) will not change or set the state of a corresponding web server 50. In such embodiments, a predefined number of determinations that are consistently biased towards cloaked or not cloaked (e.g., most but not all of the features match) are required before a state is changed in the direction of the bias. Additionally, the state field in some embodiments indicates how consistently a corresponding web server 50 is determined to be cloaked or not cloaked. If, for example, a given web server 50 has, over an extended period of time, consistently been determined to be cloaked, the value of additional tests may decline. Similarly, if a given web server 50 has, over an extended period of time, consistently been determined to not be cloaked, the value of additional tests may decline. In such cases, additional testing of such web servers 50 may be delayed in favor of testing other, less stable or unknown, web servers 50. The state, therefore, preferably reflects these situations so that such web servers 50 are selected less frequently for testing. Additional states and policies for determining whether a web server is cloaked may be apparent to those skilled in the art and systems and methods of implementing these are within the scope of the present invention.

In preferred embodiments of the present invention, feature vector representations of objects are compared to determine if the objects are substantially similar. In some embodiments, the feature vector representation of a first object is said to match the feature vector representation of a second object if at least a predetermined number of features in the two feature vectors are the same.

At some point, a feature vector and a corresponding URL are received from a client 40 in response to the same URL being supplied to the client 40 in a query response. The feature vector from the client 40 (i.e., the client feature vector) is generated by the client 40 from an object corresponding to the URL. The cloak detection module 216 stores the feature vector and the corresponding URL from the client 40 in the table of URL and feature vector combinations 224. More specifically, the cloak detection module 216 creates a new entry 226 in the table of URL and feature vector combinations 224 and stores the feature vector and the corresponding URL in the new entry 226.

In preferred embodiments, the cloak detection module 216 subsequently directs the web crawler module 212 to obtain an object corresponding to the URL. In other embodiments, the cloak detection module 216 obtains a copy of the object corresponding to the URL from the table of URLs 219. In still other embodiments, the cloak detection module 216 obtains the object corresponding to the URL without the assistance of the web crawler module 212. In these embodiments, the cloak detection module 216 preferably runs on the same machine as the web crawler module 212 or on a machine that is known by web server operators to be associated with the web crawler module 212 (i.e., using an IP-address associated with the web crawler module 212). Additionally, the USER_AGENT field of requests sent by the cloak detection module 216 is preferably identical to the USER_AGENT field of requests sent by the web crawler module 212. It is important that a web server 50 receiving a request directly from a cloak detection module 216 is able to determine that the request is associated with the web crawler module 212 (i.e., a web crawler/search engine).

The cloak detection module 216 then directs the feature vector module 214 to create a feature vector (herein called the server feature vector) from the object corresponding to the URL obtained by, or under the direction of, the cloak detection module 216. In an alternate embodiment, the table of URLs 219 stores a copy of the server feature vector for the object corresponding to each URL in the table (or for each URL that has been successfully downloaded by the web crawler module 212) and the cloak detection module 216 obtains the server feature vector for the object corresponding to the URL from the table of URLs 219, without having to compute the server feature vector. In other words, in this alternate embodiment the web crawler module 212, or another module of the search engine 30, uses the feature vector module 214 to process the objects downloaded by the web crawler module and to store the resulting feature vector in the table of URLs 219.

The cloak detection module 216 then preferably uses the URL as an index into the table of URL and feature vector combinations 224 to extract the corresponding client feature vector and compare the client feature vector to the server feature vector. Depending on the results of the comparison and the state of the URL as defined by an entry 222 in the table of web servers 220, the state of the URL is updated as described above. The cloak detection module 216 also updates the date field in the table of web servers 220 and removes the entry 226 in the table of URL and feature vector combinations 224.

In an alternate embodiment, the table of URL and feature vector combinations 224 is not used. Instead, the object corresponding to each URL to be checked by the cloak detection module is downloaded and processed by the search engine to generate a server feature vector prior to sending the URL to a client 40 for downloading. As indicated above, the server feature vector is preferably stored in the table of URLs 219. When the client feature vector is received back from the client 40, the cloak detection module compares the client feature vector with the server feature vector for the same URL and then updates a corresponding entry 222 in the table of web servers 220.

If a given web server 50 is determined to be cloaked, several steps can be taken to address this problem without departing from the scope of the invention. For example, the query processor module 210 can exclude from responses to requests from clients 40 information regarding a cloaked web server 50 or a specific URL corresponding to the web server 50 that would otherwise be included. Additionally, a cloaked web server 50 can be "black-listed" so that it is not queried in the future by the web crawler module 212, thereby preventing the web crawler module 212 from determining what objects are available on the cloaked web server 50 and whether these objects have been modified. Finally, the query processor module 210 can include a warning with a query response indicating that a given URL corresponds to a cloaked web server 50.

Figure 3:
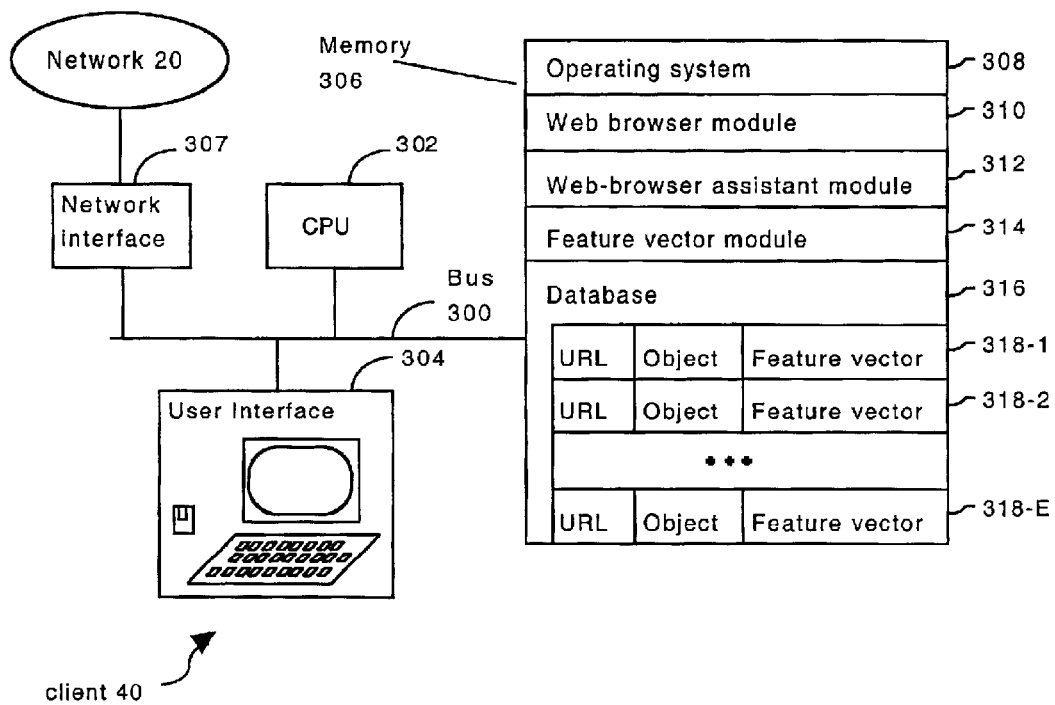
FIG. 3 is a block diagram of a client consistent with a preferred embodiment of the present invention.

As indicated in FIG. 3, the clients 40 preferably include standard computer components such as a central processing unit 302, a user interface 304 (e.g., keyboard, mouse, and a display), a memory 306, a network interface 307 for coupling the clients 40 to a search engine 30 and various web servers 50 via communications network 20, and one or more system buses 300 that interconnect these components. Memory 306, which typically includes high speed random access memory as well as non-volatile storage such as disk storage, stores an operating system 308, a web browser module 310, a web-browser assistant module 312, a feature vector module 314, and a database 316.

The operating system 308 includes procedures for handling various basic system services and for performing hardware dependent tasks. Further, the central processing unit 302 executes the programs (i.e., the web browser module 310, the web-browser assistant module 312, and the feature vector module 314) under the control of the operating system 308, which also provides the programs with access to system resources, such as the memory 306 and user interface 304.

The web browser module 310 is used to access objects (e.g., HTML documents, graphics, etc.) available from web servers 50 and the search engine 30 via the communications network 20. As indicated above, the clients 40 query the search engine 30 for URLs corresponding to one or more web servers 50. More specifically, the clients 40 typically request a plurality of hyperlinks to objects available from the web servers 50. The web browser module 310 is typically the means by which these queries are submitted by the clients 40. Examples of web browsers known in the art include Microsoft® Internet Explorer and Netscape® Navigator. Either of these web browsers are suitable for the present invention.

In the preferred embodiment, the web-browser assistant module 312 comprises a plug-in that works in conjunction with the web browser module 310. In the preferred embodiment, the web browser module 310 loads the web-browser assistant module 312 each time the web browser module 310 is loaded (i.e., becomes an active, running program on a client 40). The web-browser assistant module 312 preferably manifests visually as a tool bar that is accessible when operating the web browser module 310. Users of clients 40 can, furthermore, preferably enter search terms (also herein called keywords) and submit the search terms as a query to the search engine 30 directly from the web-browser assistant module 312.

In alternate embodiments, the web-browser assistant module 312 is not visible to users of the clients 40. In these embodiments, users of a client 40 submit queries to search engines 30 from the web browser module 310. The operation of the web-browser assistant module 312 is, therefore, largely invisible to users of the clients 40 in these embodiments.

As is known in the art, plug-ins and tool bars are able to communicate with, and control, web browsers using an application programming interface ("API") that corresponds to the particular web browser used. In preferred embodiments, the web browser module 310 and the web-browser assistant module 312 interact in this way.

For example, in embodiments of the present invention in which the web browser module 310 comprises Netscape® Navigator, the web-browser assistant module 312 can use what is currently known as the Netscape.Network.1 automation object to access web servers 50 and the search engine 30 using mechanisms of Netscape® Navigator such as the SSL security protocol, proxy support, SOCKS support, cache support, and numerous Internet protocols. In particular, the web-browser assistant module 312 can use the Open ( ) function, which is included in the Netscape.Network.1 automation object, to direct the web browser module 310 to submit a query to the search engine 30 and to download an object corresponding to a URL from a web server 50. Use of the Netscape.Network.1 automation object does not necessarily result in the display, on user interface 304, of an object downloaded from a web server 50.

Similarly, the web-browser assistant module 312 can request notification each time the web-browser module 310 goes through an object transition (e.g., displays or loads a new HTML document). For example, in embodiments of the present invention in which the web browser module 310 comprises Netscape® Navigator, the web-browser assistant module 312 can use what is currently known as dynamic data exchange ("DDE") to control Netscape® Navigator. In particular, the web-browser assistant module 312 registers with Netscape® Navigator using DDE, which has the effect of opening a communications channel between the web browser module 310 and the web-browser assistant module 312. The communications channel enables the web-browser assistant module 312 to obtain a copy of each search engine query response received by the web browser module 310 and to determine whether that object contains a request for the web-browser assistant to process a URL selected by the cloak detection module 216.

As noted above, the query processor module 210 of the search engine 30 includes a URL selected by the cloak detection module 216 with at least a subset of the responses to queries received from at least a subset of the clients 40. And as also noted above, the responses include a plurality of hyperlinks (i.e., URLs). Both the URL selected by the cloak detection module 216 and the plurality of hyperlinks are preferably delivered to the clients 40 in an HTML document. As is known in the art, HTML documents can include a header, which is demarcated by the tags "<head>" and "</head>" and stores a document title and other, optional elements. Each element of the header is typically demarcated by its own pair of complementary tags, such as <title> and </title>. The contents of the document header are typically not displayed by the web browser module 310. In some embodiments, therefore, the URL selected by the cloak detection module 216 is preferably inserted into the header of an HTML document comprising a response by the query processor module 210. For instance, in one embodiment the URL selected by the cloak detection module 216 is stored in an element (also called a field) of the document header demarcated by a pair of complementary tags, such as <cloakchk> and </cloakchk>, which need be recognizable only by the web-browser assistant module 312. If the web browser module 310, and other web browsers known in the art, do not recognize a given tag, which is likely in this case, the contents of the tagged element (i.e., the information between the pair of complementary tags) are ignored. An HTML document returned by the query processor module 210 can, therefore, include a URL selected by the cloak detection module 216 without adversely affecting a client 40 regardless of whether the client is configured in accordance with the present invention. Note that additional instructions need not be included with the URL since the tags recognizable only by the web-browser assistant module 312 effectively comprise an instruction to the web-browser assistant module 312 to take action. Nevertheless, additional information such as operating parameters for the feature vector module 314 or notification of software updates can be included along with the URL.

But in some embodiments, a URL selected by the cloak detection module 216 is instead included in the HTTP header of responses to queries received from the clients 40. Table 2 illustrates the contents of a typical HTTP header modified in accordance with an embodiment of the present invention:

TABLE 2

HTTP/1.0 200 OK
Server: Microsoft-IIS/5.0
Date: Tue, 18 Dec 2001 06:31:55 GMT
Content-Length: 10867
Content-Type: text/html
X-Check-For-Cloak: http://www.some-site.com/index.html The first line of Table 2 identifies the protocol used and whether the request was successful from the perspective of the protocol. In this example, the protocol is version 1.0 of HTTP. The second line of Table 2 is an optional aspect of HTTP headers that identifies the web server software run by the search engine 30 that sent the response. The third, fourth, and fifth lines of Table 2 indicate, respectively, the current date and time according to the search engine 30, the size of the accompanying object in bytes, and the format (i.e., content type) of the accompanying object. The sixth line of Table 2 identifies a URL selected by the cloak detection module 216. The first five lines of Table 2 are representative of typical HTTP headers. The sixth line is a modification consistent with an embodiment of the present invention.

As noted above, unknown tags are ignored by the web browser module 310 and other web browsers known in the art. The same is true of unknown elements, fields, or lines of an HTTP header. An HTTP header returned by the search engine 30 can, therefore, include a URL selected by the cloak detection module 216 without adversely affecting a client 40 regardless of whether the client is configured in accordance with the present invention. Note that additional instructions need not be included with the URL since an HTTP header element identifier (e.g., "X-Check-For-Cloak") recognizable only by the web-browser assistant module 312 effectively comprises an instruction to the web-browser assistant module 312 to take action. Nevertheless, additional information such as operating parameters for the feature vector module 314 or notification of software updates can be included along with the URL.

Additionally, persons skilled in the art recognize that techniques similar to those described above permit the web-browser assistant module 312 to access the HTTP header to obtain information germane to the present invention.

The feature vector module 314 generates a feature vector from an object. As noted above, a feature vector is a representation of an object that comprises a plurality of discrete features and is typically much smaller than the object. Typically, the web-browser assistant module 312 directs the feature vector module 314 to create a feature vector from an object that corresponds to the URL selected by the cloak detection module 216.

The database 316, which comprises a cache of documents downloaded by the web browser module, preferably includes entries 318 for each URL selected by the cloak detection module 216 and received by a particular client 40. Initially, an entry 318 includes only the URL. But after the web-browser assistant module 312 receives the object corresponding to the URL, the entry 318 is updated to include the object. Furthermore, the entry 318 may also be subsequently updated to include a feature vector created by the feature vector module 314 from the object. In some embodiments, an identifier of the search engine 30 is included in the database 316 for use when the web browser module 310 delivers the URL and the feature vector to the search engine 30.

Figure 4:
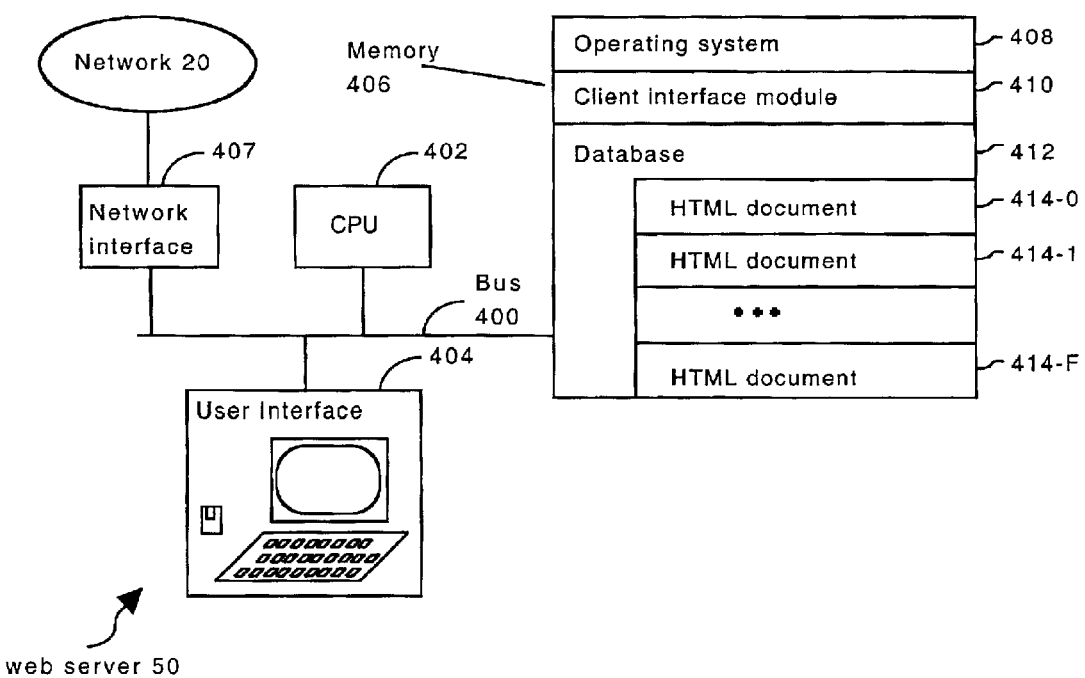
FIG. 4 is a block diagram of a web server consistent with a preferred embodiment of the present invention.

As indicated in FIG. 4, a typical web server 50 preferably includes standard computer components such as one or more central processing units 402, an optional user interface 404 (e.g., keyboard, mouse, and a display), a memory 406, a network interface 407 for coupling the web server 50 to a client 40 and a search engine 30 via communications network 20, and a bus 400 that interconnects these components. Memory 406, which typically includes high speed random access memory as well as non-volatile storage such as disk storage, stores an operating system 408, a client interface module 410 (sometimes called a protocol engine), and a database 412 of documents.

The operating system 408 includes procedures for handling various basic system services and for performing hardware dependent tasks. Further, the central processing unit 402 executes the programs (i.e., the client interface module 410) under the control of the operating system 408, which also provides the programs with access to system resources, such as the memory 406 and user interface 404.

The client interface module 410 (e.g., Apache and Microsoft® Internet Information Server (IIS)) preferably serves static content (e.g., HTML documents and images) or dynamic content (e.g., content generated using the Common Gateway Interface standard) to a web browser module 310 operating on a client 40 or a web crawler module 212 operating on a search engine 30 via communications network 20 using well known principles.

Further, the client interface module 410 may store static content in the database 412 illustrated in FIG. 4. The database 412 typically includes an entry 414 for each object stored in the database 412. In other embodiments, the client interface module 410 stores the static content in a directory system instead of, or in addition to, the database 412.

Figure 5:
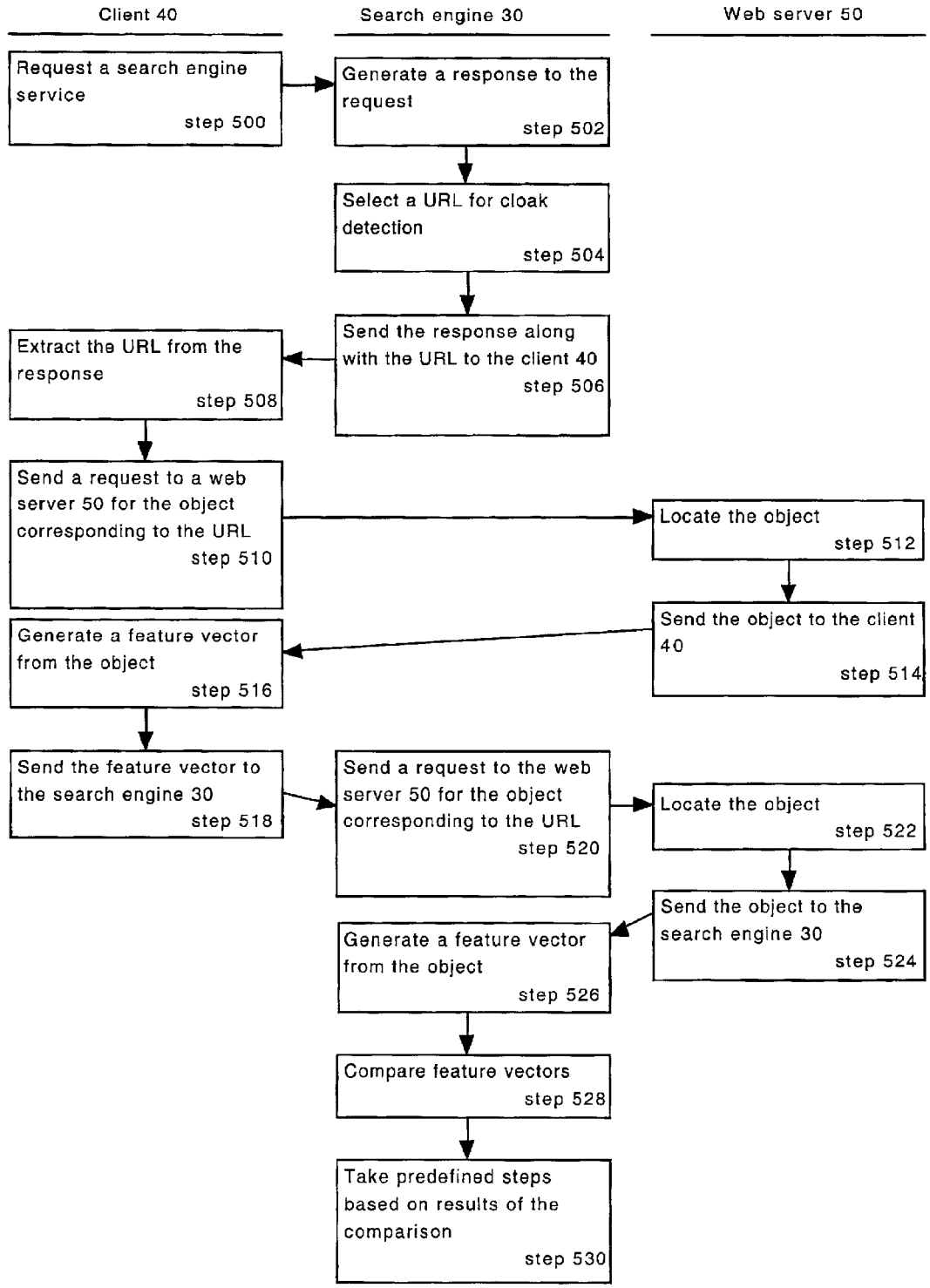
FIG. 5 illustrates steps used to implement a preferred embodiment of the present invention.

Turning now to FIG. 5, there are illustrated steps used to implement a preferred embodiment of the present invention. In a first step, a client 40 issues a request for a search engine service (step 500). As indicated above, this typically includes a user of the client 40 entering one or more search terms into the web-browser assistant module 312. The web-browser assistant module 312 then directs the web browser module 310 to send an HTTP message including the search terms to the search engine 30. To send the HTTP message, the web-browser assistant module 312 takes advantage of the networking capabilities of the web browser module 310. At this point, the web-browser assistant module 312 need not take any particular action in anticipation of, or in preparation for, processing a URL selected by the cloak detection module 216. Instead, the web-browser assistant module 312 preferably waits for notification from the web browser module 310 each time the web browser module 310 loads an object.

Once the request is received by the search engine 30, the query processor module 210 generates a response using techniques known in the art (step 502). Briefly, the query processor module 210 scans the table of URLs 219 for zero or more URLs that best match the query. The best matching URLs, if any, are preferably assembled in an HTML document.

Additionally, the query processor module 210 solicits a URL from the cloak detection module 216 upon receiving the query from the client 40. In response, the cloak detection module 216 selects a URL from the table of web servers 220 (step 504). The particular function used to select the URL is not critical to the present invention. But the table of web servers 220 preferably includes information such as the date on which the corresponding web server 50 was last selected and the current state of the corresponding web server 50 in the selection process. For example, the cloak detection module 216 in some embodiments of the invention selects the URL with the oldest date, i.e., the longest amount of time since the last test. In another embodiment, the cloak detection module 216 selects one of the URLs in the response to the query if any of the URLs in the response correspond to a web server whose cloak status needs to be checked, and otherwise selects a URL from the URLs stored in the table of web servers 220. In still another embodiment, the URLs in the table of web servers 220 are selected sequentially, in round robin fashion. In yet another embodiment, the cloak detection module 216 maintains a list of URLs previously selected from the table of web servers 220, but for which no response has been obtained from the client computer to which the URL was sent. URLs in this list that were last sent to a client computer more than a predefined amount of time ago (e.g., one minute) are re-selected by the cloak detection module 216.

After selecting a URL, the cloak detection module 216 forwards the URL to the query processor module 210, which inserts the URL into its query response and sends the response to the client 40 from which the query originated (step 506).

Upon receiving the response at the client 40, the web browser module 310 preferably loads the HTML document included therein. The web browser module 310 also notifies the web-browser assistant module 312, which scans the HTML document, or alternatively the accompanying HTTP header, to extract the URL selected by the cloak detection module 216 (step 508) and preferably stores the URL in a new entry 318 in the database 316.

The web-browser assistant module 312 then directs the web browser module 310 to download an object corresponding to the URL selected by the cloak detection module 216 from the web server 50 identified by a hostname included with the URL (step 510).

After directing the web browser module 310 to download the object, the web-browser assistant module 312 typically requests status updates from the web browser module 310 to determine when the object is available to the web-browser assistant module 312. But in some embodiments, the web browser module 310 notifies the web-browser assistant module 312 when the object is available to the web-browser assistant module 312, so no action need be taken by the web-browser assistant module 312 with respect to this object until such notification is received.

Upon receiving the object request (e.g., HTTP request for an HTML document) at the web server 50, the client interface module 410 creates the object dynamically or locates the object in an entry 414 of the database 412 or on the disk storage of the memory 406 (step 512). After locating or creating the object, the client interface module 410 sends the object to the client 40 (step 514). As noted above, aside from engaging in cloaking, the operation of the web server 50 is not critical to the present invention.

Once the object is available to the web-browser assistant module 312, the web-browser assistant module 312 stores the object in a corresponding entry 318 of the database 316. The web-browser assistant module 312 then directs the feature vector module 314 to generate a feature vector from the object (step 516).

Figure 6:
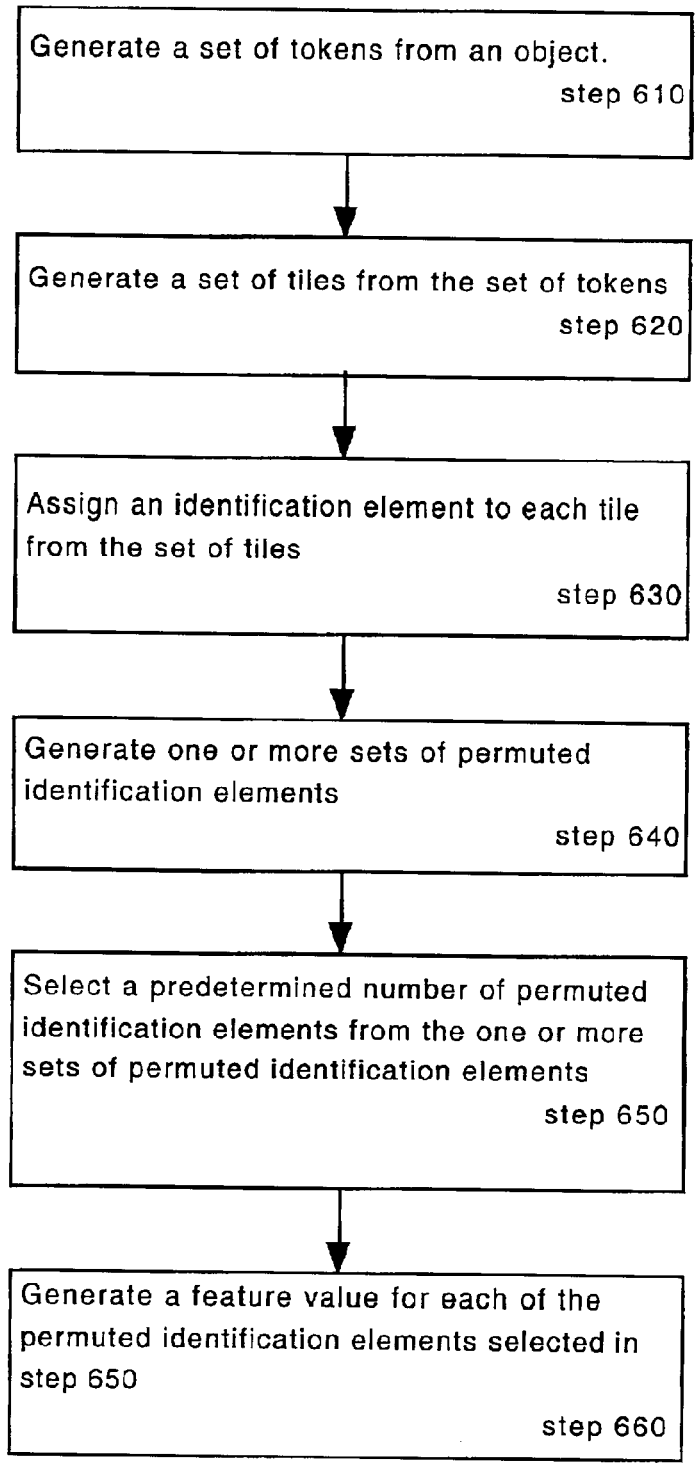
FIG. 6 illustrates steps used to generate a feature vector.

FIG. 6 illustrates the operation of the feature vector module 314 (and 214) in more detail. First, a set of canonicalization rules are applied to the object to generate a set of tokens (step 610), wherein each token represents an aspect of the object (e.g., a word). One canonicalization rule, for example, includes expanding the object to include common variations of one or more of the tokens. A set of tiles are then generated from the set of tokens (step 620), wherein each tile comprises a sequence of two or more of the tokens that form the set of tokens. Next, the feature vector module 314 assigns an identification element to each tile in the set of tiles to create a set of identification elements (step 630). An identification element is typically a short tag for a larger or relatively large item such as a tile. In a preferred embodiment, the identification elements are generated in step 630 by applying a hash function or fingerprint function to each tile in the set of tiles generated in step 620.

The feature vector module 314 then creates a set of permuted identification elements (step 640). Each set preferably consists of a permuted version of each of the identification elements assigned in step 630. Further, each permuted identification element in a given set of permuted identification elements is the result of a common permutation process. Further, a different permutation process is preferably used for each of the sets of permuted identification elements. The feature vector module 314 then selects a predetermined number of permuted identification elements, which the feature vector module 314 partitions into a plurality of groups (step 650). The selected permuted identification elements are selected using a selection function. In some embodiments the selection function selects the identification elements with the lowest or highest value in each set of permuted identification elements. Other selection functions can be used without departing from the scope of the present invention.

Finally, the feature vector module 314 produces a feature value from each of the plurality of groups (step 660). Each feature value is the result of applying a function (e.g., a hash function or a fingerprint function) to a corresponding group of permuted identification elements. The set of resulting feature values comprises the feature vector for the object. The result of this process is a representation (i.e., a feature vector) that is both accurate with respect to determining whether two objects match (i.e., exactly match or, preferably, substantially match) and compact in comparison to the object from which it is derived.

Methods for generating feature vectors for specified documents are disclosed in U.S. Pat. No. 6,119,124 entitled "Method For Clustering Closely Resembling Data Objects" and U.S. Pat. Nos. 5,909,677 and 6,230,155 both entitled "Method For Determining The Resemblance Of Documents". Each of these patents is incorporated herein by reference as background information.

The feature vector comprises a plurality of feature values, and is preferably stored in a corresponding entry 318 of the database 316, which now includes the URL selected by the cloak detection module 216, an object corresponding to the URL, and a feature vector generated from the object. Referring once again to FIG. 5, the web-browser assistant module 312 directs the web browser module 310 to send the URL and the feature vector to the search engine 30 (step 518).

Upon receiving the URL and the feature vector at the search engine 30, the cloak detection module 216 directs the web crawler module 216 to request the object corresponding to the URL received from the client 40 from the web server 50 identified by the URL (step 520). In a preferred embodiment, the cloak detection module 216 stores the URL and feature vector received from the client 40 in an entry 226 of the table of URL and feature vector combinations 224 for subsequent processing.

Upon receiving the object request at the web server 50, the client interface module either creates the object dynamically or locates the object in an entry 414 of the database 412 or on the disk storage of the memory 406 (step 522). If the web server 50 is cloaked, the client interface module 410 will probably detect that the request originated from a search engine 30 and create or locate an object specifically for that search engine 30. After locating or creating the object, the client interface module 410 sends the object to the search engine 30 (step 524).

Once the object is received from the web server 50 at the search engine 30, the cloak detection module 216 directs the feature vector module 214 to create a feature vector (i.e., the server feature vector) from the object (step 526), which preferably operates as described above with reference to FIG. 6. The cloak detection module 216 then compares the two feature vectors—one created by the client 40 and the other created by the search engine 30 (step 528).

As described above, in an alternate embodiment, steps 520, 522, 524, 526 for downloading the object at the specified URL and generating a server feature vector for the object are performed prior to sending the specified URL to a client (at step 506) for downloading.

As stated above, a feature vector comprises a plurality of feature values. The likelihood that a first object closely resembles (i.e., is substantially similar to) a second object is very high when a feature vector of the first object shares at least a predetermined number of features with a feature vector of the second object. If the first object closely resembles (or is substantially similar to) the second object (i.e., at least the predetermined number of features match), then it is unlikely that the web server 50 is cloaked. An exact match is not required because objects (i.e., web pages) may change in minor ways from time to time due to advertising content and other non-substantive changes. A web page at the specified URL may also vary slightly from one download to the next because it contains dynamically generated contact, such as the date and time of day, or the name of a user associated with the requesting computer. Additionally, a feature vector is only a representation and does not capture all of the features of a given object. It is therefore possible (but very unlikely), that non-matching objects may produce identical feature vectors. In addition, it is possible (but once again unlikely) that two objects that are different but substantially similar in all important respects may have feature vectors that do not have at least the predetermined number of features in common.

Depending on the result of the comparison, the cloak detection module 216 takes one or more predetermined steps (step 530). For example, the cloak detection module 216 preferably updates the state of the URL in the table of web servers 220. Additionally, if the web server 50 is cloaked, the cloak detection module can modify the table of URLs 219 so that the query processor module 210 does not include URLs corresponding to this web server 50 in query responses until after subsequent testing indicates that the web server 50 is no longer cloaked.

The present invention can be implemented as a computer program product that includes a computer program mechanism embedded in a computer readable storage medium. For instance, the computer program product could contain the program modules shown in FIG. 2 or FIG. 3 or both. These program modules may be stored on a CD-ROM, magnetic disk storage product, or any other computer readable data or program storage product. The program modules may also be distributed electronically, via the Internet or otherwise, by transmission of a computer data signal (in which the program modules are embedded) on a carrier wave.

While the present invention has been described with reference to a few specific embodiments, the description is illustrative of the invention and is not to be construed as limiting the invention. Various modifications may occur to those skilled in the art without departing from the scope of the invention as defined by the appended claims.

For example, in alternate embodiments, the web-browser assistant module 312 operates independently of the web browser module 310. In these embodiments, the web-browser assistant module 312 includes functionality typically found in web browser, i.e., the ability to interact with web servers 50 and search engines 30 to send and receive objects.

In other embodiments, the web-browser assistant module 312 is not passive as described above. In these embodiments, the web-browser assistant module 312 requests the selection of a URL by the cloak detection module 216 periodically or according to some other schedule.

In still other embodiments, the cloak detection module 216 does not wait for requests for search engine 30 services to select a URL for cloak detection. Instead, the cloak detection module 216 selects such URLs on an on-going basis. The selected URLs are subsequently distributed to one or more clients 40 that are configured to receive unsolicited URLs from the cloak detection module 216 and that are known to the cloak detection module 216.

In some embodiments, the web-browser assistant module 312 monitors the web browser module 310 to determine whether a user operating the client 40 selects one of the URLs selected by the query processor module 210. If so, the web-browser assistant module 312 generates a feature vector from the object corresponding to the selected URL, and sends the selected URL and corresponding feature vector to the search engine 30. In these embodiments, therefore, network resource requirements of the present invention are reduced. And in some of these embodiments, the cloak detection module 216 selects a URL from among the zero or more URLs selected by the query processor module 210. So if a user operating the client 40 does not select one of the URLs selected by the query processor module 210, the web-browser assistant module 312 will instead process the URL selected by the cloak detection module 216.

Finally, some embodiments are designed for systems that have relatively large amounts of bandwidth available for use by the present invention. In these systems, feature vectors, which as noted above are compressed representations of objects, are not used. Instead, the client 40 forwards the object, a portion of the object, or an object representation dissimilar to the feature vector described above, to the search engine 30. Like the client 40, the search engine 30 does not use feature vectors and compares objects, portions of objects, or object representations dissimilar to the feature vector described above to determine whether the objects match.

What is claimed is:

1. A method for identifying a cloaked web server comprising:

receiving from a client computer a representation of a first object, said first object returned by a web server to said client computer in response to a first request from said client computer for an object corresponding to a network address, said web server addressed by said network address;

receiving from the web server a second object in response to a second request for the object corresponding to said network address; and comparing the representation of the first object to a representation of the second object, and determining that the web server is cloaked if said representation of the first object does not match said representation of the second object.

2. The method of claim 1, further comprising sending to the client computer the network address prior to receiving from the client computer the representation of the first object.

3. The method of claim 2, further comprising selecting the network address from a set of network addresses according to a predefined function.

4. The method of claim 2, further comprising periodically sending one of a set of network addresses to the client computer according to a predefined schedule, the network address being selected from said set of network addresses.

5. The method of claim 2, further comprising receiving from the client computer a request for the network address prior to sending the network address to the client computer.

6. The method of claim 2, further comprising receiving from the client computer a request for search engine services prior to sending the network address to the client computer; and sending to the client computer a response to the request for the search engine services, said response to the request for the search engine services including the network address.

7. The method of claim 6, wherein the request for search engine services includes one or more search terms; and the response to the request for search engine services includes one or more network addresses corresponding to the one or more search terms.

8. The method of claim 7, wherein the network address corresponds to the one or more search terms.

9. The method of claim 7, further comprising when the web server is determined to be cloaked, excluding from the response to the request network addresses addressing the web server.

10. The method of claim 6, wherein the response to the request for search engine services includes an instruction directing the client computer to return the representation of the first object.

11. The method of claim 1, wherein the representation of the first object is a first feature vector comprising a first set of features;

the representation of the second object is a second feature vector comprising a second set of features; and the comparing and determining including determining whether the second feature vector has at least a predetermined number of features in common with the first feature vector.

12. The method of claim 1, further comprising maintaining a list of network addresses corresponding to a search term, said list of network addresses including the network address; and removing from the list of network addresses the network address if the representation of the first object does not match the representation of the second object.

13. The method of claim 1, further comprising maintaining a list of cloaked web servers; and adding to the list of cloaked web servers the web server if the representation of the first object does not match the representation of the second object.

14. A computer system for identifying a cloaked web server comprising:

a central processing unit, an instruction module, and a network interface;

the instruction module being executable by the central processing unit and including client interface instructions for receiving from a client computer through the network interface a representation of a first object, said first object returned by a web server to said client computer in response to a first request from said client computer for an object corresponding to a network address, said web server addressed by said network address;

web server interface instructions for receiving through the network interface a second object returned by the web server in response to a second request from the computer system for the object corresponding to the network address; and compare instructions for comparing the representation of the first object to a representation of the second object and for determining that the web server is cloaked if said representation of the first object does not match said representation of the second object.

15. The computer system of claim 14, the instruction module further comprising additional client interface instructions for sending the network address to the client computer prior to receiving the representation of the first object from said client computer.

16. The computer system of claim 15, the instruction module further comprising instructions for selecting the network address from a set of network addresses according to a predefined function.

17. The computer system of claim 16, the instruction module further comprising instructions for periodically sending one of a set of network addresses to the client computer according to a predefined schedule, the network address being selected from said set of network addresses.

18. The computer system of claim 15, the instruction module further comprising instructions for receiving from the client computer a request for the network address prior to sending the network address to the client computer.

19. The computer system of claim 15, the instruction module further comprising instructions for receiving from the client computer a request for search engine services prior to sending the network address to the client computer; and instructions for sending to the client computer a response to the request for the search engine services, said response to the request for the search engine services including the network address.

20. The computer system of claim 19, wherein the computer system comprises a web server configured to provide search engine services to one or more client computers.

21. The computer system of claim 19, wherein the request for search engine services includes one or more search terms; and the response to the request for search engine services includes one or more network addresses corresponding to the one or more search terms.

22. The computer system of claim 21, wherein the network address corresponds to the one or more search terms.

23. The computer system of claim 19, wherein the response to the request for search engine services includes an instruction directing the client computer to return the representation of the first object.

24. The computer system of claim 19, the instruction module further comprising instructions for deriving the representation of the second object;

wherein the representation of the first object is a first feature vector comprising a first set of features;

the representation of the second object is a second feature vector comprising a second set of features; and the compare instructions include instructions for determining whether the second feature vector has at least a predetermined number of features in common with the first feature vector.

25. The computer system of claim 19, the instruction module further comprising instructions for maintaining a list of network addresses corresponding to a search term, said list of network addresses including the network address; and instructions for removing from the list of network addresses the network address if the representation of the first object does not match the representation of the second object.

26. The computer system of claim 14, the instruction module further comprising instructions for maintaining a list of network addresses corresponding to a search term; and instructions for removing from the list of network addresses each network address corresponding to the web server if said web server is cloaked.

27. The computer system of claim 14, the instruction module further comprising instructions for maintaining a list of cloaked web servers; and instructions for adding to the list of cloaked web servers the web server if said web server is determined to be cloaked.

28. A computer program product for use in conjunction with a computer system, the computer program product comprising a computer readable storage medium and a computer program mechanism embedded therein, the computer program mechanism comprising:

client interface instructions for receiving from a client computer a representation of a first object, said first object returned by a web server to said client computer in response to a first request from said client computer for an object corresponding to a network address, said web server addressed by said network address;

web server interface instructions for receiving a second object returned by the web server in response to a second request from said computer system for the object corresponding to said network address; and compare instructions for comparing the representation of the first object to a representation of the second object to determine if the representation of the first object matches the representation of the second object; and cloak determination instructions for determining that the web server is cloaked if said representation of the first object does not match said representation of the second object.

* * * * *

UNITED STATES PATENT AND TRADEMARK OFFICE
CERTIFICATE OF CORRECTION

PATENT NO. : 6,910,077 B2  
APPLICATION NO. : 10/039603  
DATED : June 21, 2005  
INVENTOR(S) : Marc A. Najork et al.

Page 1 of 1

It is certified that error appears in the above-identified patent and that said Letters Patent is hereby corrected as shown below:

In column 17, lines 57-60, in Claim 23, delete "The computer system of claim 19, wherein the response to the request for search engine services includes an instruction directing the client computer to return the representation of the first object." and insert -- The computer system of claim 21, the instruction module further comprising instructions for excluding from the response to the request network addresses addressing the web server when the web server is determined to be cloaked. --, therefor.

Signed and Sealed this

Eighteenth Day of August, 2009

David J. Kappos  
*Director of the United States Patent and Trademark Office*